April 26, 1932.  W. C. STEVENS  1,855,208
MOTOR CONTROLLER
Original Filed July 26, 1920  2 Sheets-Sheet 1

INVENTOR.
William C. Stevens.
BY
Franics W. Hubbard
ATTORNEY.

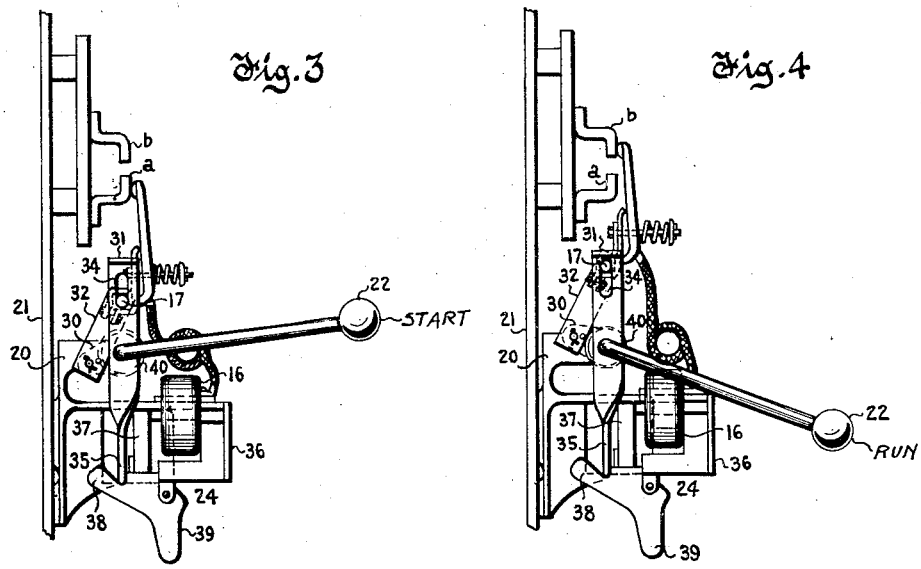
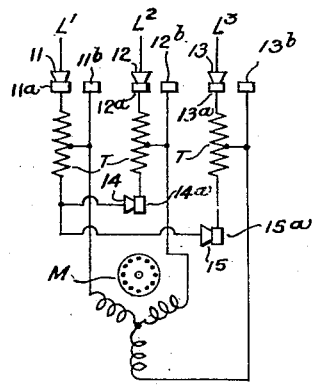
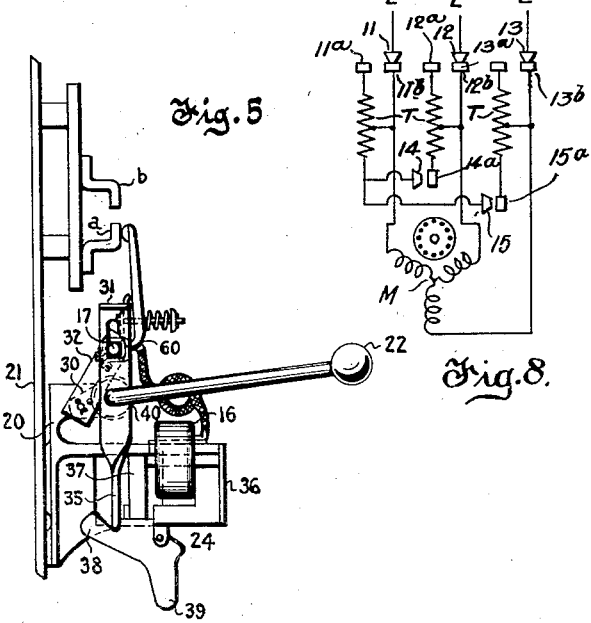
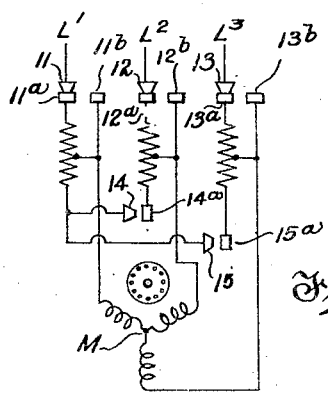

Patented Apr. 26, 1932

1,855,208

UNITED STATES PATENT OFFICE

WILLIAM C. STEVENS, OF MILWAUKEE, WISCONSIN, ASSIGNOR, BY MESNE ASSIGNMENTS, TO CUTLER-HAMMER INC., OF MILWAUKEE, WISCONSIN, A CORPORATION OF DELAWARE

MOTOR CONTROLLER

Original application filed July 26, 1920, Serial No. 399,075. Divided and this application filed November 12, 1927. Serial No. 233,021.

This invention relates to starting controllers for electric motors.

In my Patent No. 1,660,399, of February 28, 1928, of which the present application is a division, there is disclosed a circuit controller capable of application in various circuits and according to the present invention I propose to utilize such circuit controller in starting systems embodying auto-transformers.

An object of my invention is to provide a starting system in which the circuit controller disclosed in the aforesaid application is utilized to transfer the motor from the auto-transformer connections to the line connections without interrupting the motor circuit.

Another object is to provide a remote control system of the aforesaid character for starting and controlling induction motors of the squirrel-cage type.

Various other objects and advantages of the invention will hereinafter appear.

The accompanying drawings illustrate an embodiment of the invention which will now be described, it being understood that the invention is capable of embodiment in other forms falling within the spirit and scope of the appended claims.

In the drawings

Figs. 2 to 4 are detailed views illustrating the controller in different operative positions, and Fig. 5 is a view similar to Fig. 3 but illustrating a slightly modified construction, and, Figs. 6, 7 and 8 show diagrammatically the connections for the various steps used in starting of the motor.

Figure 1:
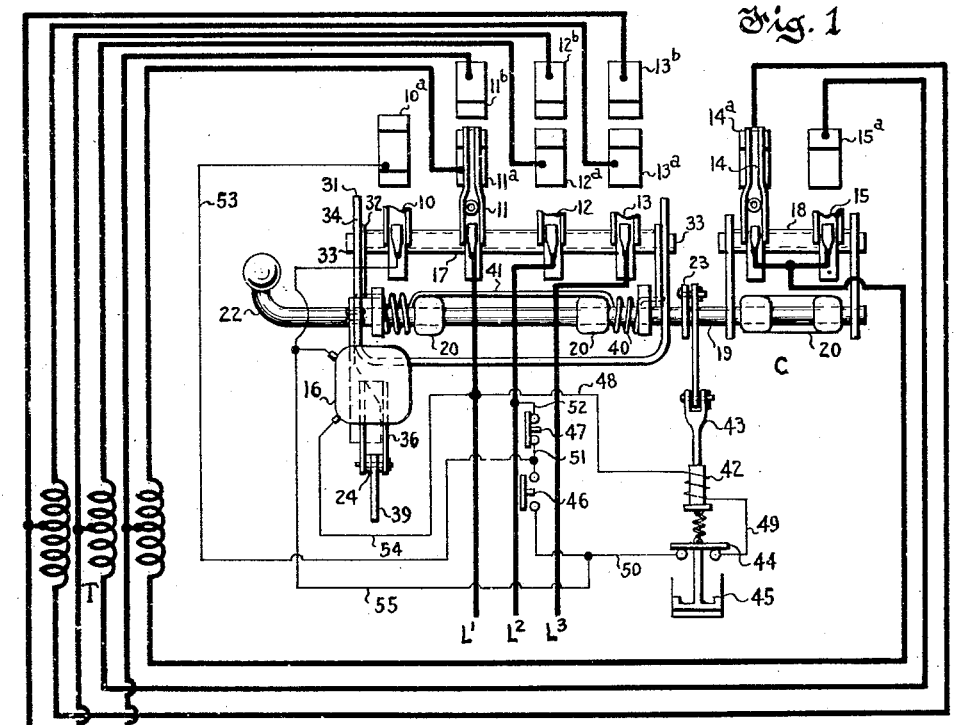
Figure 1 is a front elevational view illustrating an embodiment of the controller.

Referring to Fig. 1 of the drawing, the same illustrates a compensator starter comprising a controller $c$ adapted to effect starting and running connections for a three phase induction motor M to be supplied from lines $L^1$, $L^2$, $L^3$, the starting connections being made through an auto-transformer T.

The controller $c$ comprises six associated switches each having a movable contactor and one or more fixed contacts to be engaged thereby, the contactors being designated by numerals 10 to 15 and their respective fixed contacts being designated by the same reference numerals supplemented by letters $a$ or $b$. For facility of description said switches may conveniently be divided into two groups, the first group comprising switches 10 to 13 and the second group comprising switches 14 and 15.

Switches 11, 12 and 13 which control the line connections of motor M, are of similar construction, each comprising two electrically independent fixed contacts, their contactors being connected, and adapted by means of operating mechanism to be hereinafter described to act simultaneously and similarly and each to engage its associated contacts progressively and selectively. Switches 14 and 15 which control the interconnections of transformer T are likewise adapted to act in unison for engagement and disengagement of their respective single fixed contacts. Switch 10 which is adapted to control the energizing circuit of a holding coil 16, has its contactor mechanically connected with the contactors of switches 11, 12 and 13 for movement therewith, its single fixed contact being elongated to provide for continuous energization of the coil 16 so long as said latter switches remain in either of their on positions.

In practice the contactors 10 to 13 are secured in resilient and spaced relation upon a bar 17 being insulated therefrom and operable thereby while the contactors 14 and 15 are similarly supported by and upon a similar bar 18. A system of levers, to be hereinafter described, is arranged at each end of each of said bars 17 and 18 for actuation of the latter and of the contactors carried thereby. Said sets of levers are in turn mounted upon a single shaft 19 for operation thereby, said shaft being itself supported by brackets 20 carried by a suitable panel 21. An operating handle 22 and a lever 23 are rigidly secured to said shaft to provide respectively for manual and power operation of the controller.

The arrangement is such that upon a predetermined angular movement of the shaft 19 by either of said operating means, all of the contactors are thrown to on position, thereby connecting the auto-transformer T across the supply lines and connecting the motor M to said transformer in suitable relation for starting. Further, the energizing circuit of coil 16 is completed thereby actuating a device indicated at 24 for latching-in switches 10 to 13, switches 14 and 15, however, being unaffected by said device. Thereafter upon release of the operating means for the shaft 19, switches 11, 12 and 13 are adapted to move automatically to their second on position thus connecting the motor directly to the supply lines for running, whereas switches 14 and 15, being unrestrained by the latching-in device 24, are free to move directly to off position thus interrupting the interconnections of the auto-transformer, the energizing circuit of the coil 16 being maintained. Should the voltage across the supply lines fail, the latching device 24 is released thus permitting switches 10 to 13 to open for disconnecting the motor and interrupting the circuit of coil 16.

Figure 2:
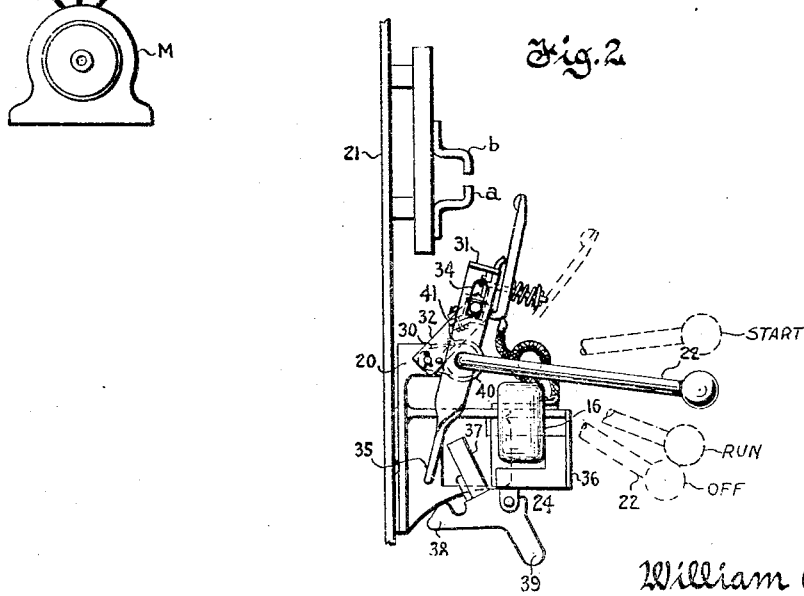

The different operative positions of the levers which provide the aforedescribed action of switches 10 to 13 are shown more in detail in Figs. 2 to 4.

As illustrated, each of the aforementioned systems of levers preferably comprises a pair of levers 30 and 31 terminally mounted upon the shaft 19, the lever 30 being rigidly secured to said shaft and the lever 31 being oscillatable relative thereto. A floating lever 32 is carried between the free ends of the said former levers and provided with a positive pivotal connection with the lever 30 and with a loose motion pivotal connection with the lever 31. The contact carrying bar 17 is rigidly secured between the floating levers 32 of the two systems of levers and adjacent the terminal portion of said levers 32 which are connected with the levers 31.

In practice said bar 17 is preferably constructed square to receive a plurality of two-part clamping brackets for mounting of the various switch contacts upon said bar in a known manner. Further such square section of said rod provides for effecting a rigid mounting thereof within the free ends of the respective floating levers 32. Moreover, said bar is provided with reduced circular terminal portions 33 extending beyond the respective floating levers 30 and each adapted to cooperate with an elongated slot 34 located adjacent the free end of its respective lever 31, thus providing the aforedescribed lost motion pivotal connection between said levers. One of said levers 31 is preferably extended beyond the point of pivotal support thereof to provide a latching lug 35.

The latching-in device 24 preferably comprises a magnetic frame 36 carried by or formed integral with one of the brackets 20, said frame carrying the energizing coil 16 and also having an armature member 37 pivotally supported thereby, said armature in turn having a latch 38 adapted to cooperate with the lug 35 and a projecting lever 39 providing for manual tripping of said latch.

The aforedescribed parts are so arranged with reference to the vertical panel 21 as to effect a gravity bias of all the movable contactors out of contact making position. Moreover, the arrangement is such that upon engagement of the lug 35 by the latch 38, the weight of the operating handle 22 acting about the axis of the shaft 19 tends to lift the floating levers 32 together with the bar 17 and the contactors carried thereby from the first on position illustrated in Fig. 3 to the second on position illustrated in Fig. 4. A helical spring 40 having its terminal portions bent about the levers 30 and also having a medial looped portion 41 abutting the brackets 20 as illustrated is preferably employed to augment and assist such tendency.

Upon elevation of the operating handle from the off position shown in dotted lines in Fig. 2, the aforedescribed movable controller parts are adapted to oscillate as a unit about the axis of the shaft 19 until the contactors engage their respective lower fixed contacts $a$ the spring 40 being placed under tension, and assuming energization of the coil 16 through closure of the switch 10, the armature 37 is attracted for latching-in the levers 31. As shown in Fig. 6 transformer T is then connected across the supply lines $L^1$, $L^2$ and $L^3$ and motor M is connected to intermediate points of the transformer winding in suitable relation for starting. Upon subsequent release of the operating handle the same is adapted to drop by the combined action of gravity and the spring 40 whereupon the switches 14 and 15, being unrestrained, are adapted to fly open for effecting a quick break. Motor M is then connected in series relation to sections of the transformer windings T as shown in Fig. 7. At the same time the floating levers 32 which are associated with the bar 17 are forced upwardly, thus causing the contactors of switches 11, 12 and 13 to leave their respective fixed contacts $a$ and move upwardly into engagement with their contacts $b$, the terminal portions 33 of the bar 17 sliding within the respective slots 34. Motor M is then connected directly to the supply circuit as shown in Fig. 8. Release of the latching device 24 either manually or through failure of voltage as aforedescribed permits the contactors to move directly to off position without re-engagement of their respective contacts $a$.

The aforedescribed construction and arrangement thus provide for simple angular movement of said contactors into their first on position, for rectilinear movement to their second on position, and for a compound linear and angular return movement to off position.

For purposes of standardization, the two systems of levers employed to effect operation of switches 14 and 15 may be constructed similar to those aforedescribed, however, as each of said switches is required to control but a single set of connections, the construction may be simplified by providing circular openings in lieu of the elongated slots 34 in the upper ends of the levers 31, the throw of said levers being correspondingly reduced, or the bars 18 may even be connected directly and rigidly with the shaft 19 as illustrated. The switch 10, being required to carry only control currents, may also be of simplified construction and may even comprise simple butt contacts, the fixed contact 10a being elongated in the manner and for the purposes described.

The power operating means for the controller comprises a solenoid 42 having its plunger 43 connected to the operating lever 23 through suitable linkage and adapted upon energization of its winding to effect an upward thrust upon said lever for moving the controller contacts to their first on position. A switch 44 having a retarding dash pot 45 is resiliently connected to said solenoid plunger to be opened thereby for deenergizing the solenoid winding and permitting the controller parts to move to running position subject to a time element during which the motor is adapted to attain running speed. A starting push button switch 46 provides for closure of the energizing circuit of said solenoid while a stop button 47 provides for interruption of the circuit of the holding coil 16.

Upon closure of the starting button 46, the energizing circuit of operating solenoid 42 is completed, said circuit extending from line L¹ by conductor 48 through the winding of said solenoid by conductor 49 through the solenoid relay 44 by conductor 50 through said starting button by conductor 51 through the stop button and by conductor 52 to line L². Said solenoid thereupon responds, drawing in its plunger and moving all of the controller contacts to their lower or first on position. Such action serves to connect the auto-transformer to the supply lines and to connect the motor M to the transformer. Closure of the starting push button also serves to complete the energizing circuit of holding coil 16, said circuit extending from line L¹ by conductor 54 through said coil, thence by conductor 55 to conductor 50 and thence to line L² as formerly traced, continuity of said circuit being thus rendered independent of relay 44.

Closure of switch 10 serves to connect conductor 55, through conductor 53 and the stop button directly to line L², shunting the starting button which may therefore be released and permitted to open as soon as the controller moves to its first on position.

After a given time interval determined by the calibration of the dash pot 45 the relay 44 is adapted to open, thus deenergizing the operating solenoid 42 whereupon the contactors of switches 11, 12 and 13 move to their second on position, thus connecting the motor directly across the supply lines, the energizing circuit of the latching coil being maintained by the switch 10. In this connection it should be noted that during movement of the contactors 11, 12 and 13 to their second on position each of the same momentarily engages both of its cooperating stationary contacts whereby the motor circuit is uninterrupted during this changeover. The solenoid operating mechanism also moves to an intermediate position wherein the relay 44 is maintained open.

The contactors of switches 14 and 15 on the other hand move directly to off position in the manner aforedescribed, thus interrupting the interconnections of the transformer. Upon failure of voltage supplied to the motor, the latching coil becomes deenergized whereupon switches 10 to 13 are free to move directly to off position.

While the controller is in either of its on positions, voluntary stopping of the motor may be effected either through opening of the stop button 47 or manual tripping of the latch 39.

Referring now to Fig. 5, the same illustrates a slight modification of the controller structure particularly applicable to hand operated controllers of the character described.

This construction differs from such formerly described construction only in the shape of the elongated slots of the levers 31, said slots in the construction now under discussion being provided at their lower inner ends with enlarged or cutout portions indicated at 60. Also in this construction of the controller the cooperating contacts of switch 10 are assumed to be simple butt contacts of such character as to open the circuit of the latching coil upon a relatively slight back movement of said contactor less than that required to effect separation of the contacts carrying the power currents.

The manual operation of the controller modified as aforedescribed is as follows: Upon elevation of the hand operating lever 22 all of the switch contactors are thrown to their first on position and if thereafter the handle be released abruptly or subjected to a sudden downward and outward pull the force upon said lever is suddenly reversed due to such pull or action of the spring 40 or both, whereupon the controller parts move immediately to their second on position with a quick break of one set of circuit connections and quick make of the other set. However, should the direction of motion of the operating handle be permitted to reverse in a sluggish or deliberate manner the projections 33 instead of moving along the elongated portions of the slots 34 will be forced by the tension of the spring 40 into the enlarged portions 60 of said slots, thus permitting the bar 17 carrying the contacts 10 to 13 to move away from the panel 22 a distance sufficient to effect opening of the switch 10 without, however, interrupting the power connections of the motor through switches 11, 12 and 13. Such interruption of the circuit of the latching coil 16 permits the latch to open whereupon the controller is adapted to move directly to off position.

The aforedescribed construction provides for movement of the controller contacts directly from starting to off position by means of the operating handle 22 without requiring tripping of the latch 39 by the operator whereby the controller may be operated for this purpose with one hand.

The modified construction possesses the further advantage of insuring that the controller be quickly and positively thrown from starting to running position, thus insuring a quick make and quick break since should the operator attempt to move the controller in a tardy or negligent manner through such stage in its operation, the magnetic latch is automatically released whereupon the controller automatically returns to off position.

What I claim as new and desire to secure by Letters Patent is:

The combination with an alternating current motor and an auto-transformer, of a plurality of cooperating contacts for connecting the motor and the transformer directly in shunt and in series relation and for excluding the transformer from the circuit of said motor, means including an operating member movable in one direction to connect the motor and the transformer in shunt, and in an opposite direction to first connect the motor and the transformer in series and to thereafter exclude the transformer from the motor circuit, and an electromagnet adapted when energized to move said member in the former direction and when deenergized to permit return movement thereof in the latter direction, manual means for controlling the energizing circuit of said electromagnet and automatic means for interrupting the energizing circuit of said electromagnet after a predetermined interval upon response thereof.

In witness whereof I have hereunto subscribed my name.

WILLIAM C. STEVENS.